| TIME t | BIT NO. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 0 | FF1 | | | | | | | | | | | | | | |
| 1 | | | | | | | | | | | | | | | |
| 2 | | FF2 | | | | | | | | | | | | | |
| 3 | | | | | | | | | | | | | | | |
| 4 | | | FF3 | | | | | | | | | | | | |
| 5 | FF4 | FF5 | FF6 | | | | | | | | | | | | |
| 6 | | | | FF1 | | | | | | | | | | | |
| 7 | | | | | | | | | | | | | | | |
| 8 | | | | | FF2 | | | | | | | | | | |
| 9 | | | | | | | | | | | | | | | |
| 10 | FF7 | FF8 | FF9 | | | | FF3 | | | | | | | | |
| 11 | | | | FF4 | FF5 | FF6 | | | | | | | | | |
| 12 | | | | | | | FF1 | | | | | | | | |
| 13 | | | | | | | | | | | | | | | |
| 14 | | | | | | | | FF2 | | | | | | | |
| 15 | | | | | | | | | | | | | | | |
| 16 | FF10 | FF11 | FF12 | | | | | | | | | | | | |
| 16 | | | | FF7 | FF8 | FF9 | | | FF3 | | | | | | |
| 17 | | | | | | | FF4 | FF5 | FF6 | | | | | | |
| 18 | | | | | | | | | | FF1 | | | | | |
| 19 | | | | | | | | | | | | | | | |
| 20 | FF13 | FF14 | FF15 | | | | | | | | FF2 | | | | |
| 21 | | | | FF10 | FF11 | FF12 | | | | | | | | | |
| 22 | | | | | | | FF7 | FF8 | FF9 | | | FF3 | | | |
| 23 | | | | | | | | | | FF4 | FF5 | FF6 | | | |
| 24 | | | | | | | | | | | | | FF1 | | |
| 25 | FF16 | FF17 | FF18 | | | | | | | | | | | | |
| 26 | | | | FF13 | FF14 | FF15 | | | | | | | | FF2 | |
| 27 | | | | | | | FF10 | FF11 | FF12 | | | | | | |
| 28 | | | | | | | | | | FF7 | FF8 | FF9 | | | FF3 |
| 29 | | | | | | | | | | | | | FF4 | FF5 | FF6 |
| 30 | FF19 | FF20 | FF21 | | | | | | | | | | | | |
| 31 | FF22 | | | FF16 | FF17 | FF18 | | | | | | | | | |
| 32 | | | | | | | FF13 | FF14 | FF15 | | | | | | |
| 33 | | FF22 | | | | | | | | FF10 | FF11 | FF12 | | | |
| 34 | | | | | | | | | | | | | FF7 | FF8 | FF9 |
| 35 | | | FF22 | | | | | | | | | | | | |
| 36 | | | | FF19 | FF20 | FF21 | | | | | | | | | |
| 37 | | | | FF22 | | | FF16 | FF17 | FF18 | | | | | | |
| 38 | | | | | | | | | | FF13 | FF14 | FF15 | | | |
| 39 | | | | | FF22 | | | | | | | | FF10 | FF11 | FF12 |
| 40 | | | | | | | | | | | | | | | |
| 41 | | | | | | FF22 | | | | | | | | | |
| 42 | | | | | | | FF19 | FF20 | FF21 | | | | | | |
| 43 | | | | | | | FF22 | | | FF16 | FF17 | FF18 | | | |
| 44 | | | | | | | | | | | | | FF13 | FF14 | FF15 |
| 45 | | | | | | | | FF22 | | | | | | | |
| 46 | | | | | | | | | | | | | | | |
| 47 | | | | | | | | | FF22 | | | | | | |
| 48 | | | | | | | | | | FF19 | FF20 | FF21 | | | |
| 49 | | | | | | | | | | FF22 | | | FF16 | FF17 | FF18 |
| 50 | | | | | | | | | | | | | | | |
| 51 | | | | | | | | | | | | FF22 | | | |
| 52 | | | | | | | | | | | | | | | |
| 53 | | | | | | | | | | | | | FF22 | | |
| 54 | | | | | | | | | | | | | FF19 | FF20 | FF21 |
| 55 | | | | | | | | | | | | | FF22 | | |
| 56 | | | | | | | | | | | | | | | |
| 57 | | | | | | | | | | | | | | FF22 | |
| 58 | | | | | | | | | | | | | | | |
| 59 | | | | | | | | | | | | | | | FF22 |

*Fig. 3*

United States Patent Office 3,174,106
Patented Mar. 16, 1965

3,174,106
SHIFT-REGISTER EMPLOYING ROWS OF FLIP-FLOPS HAVING SERIAL INPUT AND OUTPUT BUT WITH PARALLEL SHIFTING BETWEEN ROWS
Roger A. Urban, St. Paul, Minn., assignor to Sperry Rand Corporation, New York, N.Y., a corporation of Delaware
Filed Dec. 4, 1961, Ser. No. 159,199
14 Claims. (Cl. 328—37)

This invention relates to shift registers which are composed of a plurality of bistable devices or stages and more particularly to that class of shift registers which utilizes transistors in each stage.

The use of shift registers which are capable of storing information in binary form and of selectively manipulating such information in response to applied control signals is well known in the computation and control art. Such registers consist of a plurality of bistable devices each of which may be defined as a device which is capable of being placed in either one of two stable states and which bistable device usually includes two input terminals and two output terminals, one of each of which is associated with one of its two states. As is well known, a bistable device has the characteristic that it will remain in either one of its two states until caused to change to the other state by the application of a significant signal upon the input terminal of the other of its then occurring states. Each bistable device has two substantially different output signal levels which are affected by the imposition of one of the two corresponding input signals upon the respective input terminal with the corresponding signals arbitrarily designated as representing a "0" or "1."

The shift register disclosed herein is an electronic circuit consisting of a series of bistable devices or stages, each stage adapted to register a "0" or a "1," i.e., emit a "0" or a "1" from the set side of the stage. The circuit on actuation by a control signal causes each stage, or group of stages, to impose upon the next succeeding stage, or group of stages, the condition that was in itself prior to initiation of the controlling signal. Essentially, the invention disclosed herein provides an apparatus wherein discrete bits of an input data word are serially entered into a first group of bistable devices. The data stored in the first group of bistable devices is then parallel shifted group-by-group to successive groups of bistable devices until the data is entered into the last group from which the data is serially exited.

The different positions of the bits of the input data word are normally assigned increasing significance which with the use of the binary arithmetic system represent the ascending power of 2, i.e., the first bit being $2^0$ and the last bit being $2^b$ where $b+1$=the number of bits in the word, or the word length. These binary numbers or digits are then represented by reference to the state of each stage of the series of stages, one state being a "0" and the other state being a "1." In the embodiment of FIG. 1 the true of the input data word is stored in the 1 or set side of the stage while the complement is stored in the 0 or clear side. Thus the true of the input data word is stored in and successively transmitted from stage-to-stage by the set side of each stage while the complement is stored in and successively transmitted from stage-to-stage by the clear side of the stage. Further, the complement of the data may be achieved in the set or true side of each stage by the simple inversion of the state of each stage in which the "0"'s are changed to "1"'s and the "1"'s are changed to "0"'s. Additionally, data may be entered directly into each stage by imposing a significant signal— in the embodiment of FIG. 1 said signal is representative of a "1"—on the appropriate input terminal.

In the past it has been necessary to provide some means of preventing the "race problem" in which the bistable device of a given stage reacts to a given input signal prior to the cessation of the application of an output signal to the next succeeding stage. These means have included delay circuits which have been incorporated in the input circuit of the output circuits of the bistable devices of each stage of the register. When delay circuits are used it is also necessary to limit the width of the controlling signal such that such signal is less than the delay provided by such means. If such precautions are not provided the information stored in the register may be shifted more than one stage during each application of the controlling signal. The shift register disclosed herein provides a novel method of gating information to successive stages, or groups of stages, within the shift register so as to preclude the possibility that a given stage may accept an input signal at the same time that it is impressing an output signal upon a successive stage which condition, if allowed, would permit the input data to be transmitted to the next successive stage, or groups of stages, with the resultant loss of data significance.

The idealized concept of a digital computer consists of four basic units: arithmetic, control, memory and input-output. In the arithmetic unit there are temporary storage locations or registers which receive data words from the memory unit. As the data word is transmitted from the memory unit to an arithmetic register or back again it passes through logical gating networks. In these gating networks the data are transformed or manipulated according to the operation being executed as determined by the control unit. Thus, it is possible to conceive of a digital computer as consisting of a temporary storage means and a permanent storage means with gating networks in between. When data words are transmitted from the permanent storage means, the computer memory, through the gating networks to the temporary storage means, the arithmetic unit registers, and then back again to the gating networks, two general methods of transmitting the data words are utilized. These methods are designated as serial or parallel transmission with the term "serial" or "parallel" designating the type of digital computer involved. In a serial computer the word is transmitted serially, in a train, one bit at a time to and from the computer's memory through the gating networks. The length of time during which one bit is transmitted from the memory through the gating networks and into the register is called a bit time, or unit time, interval. Thus, if a word has L bits, it would take L bit time intervals to transmit this data word through an arithmetic register from the computer's memory or back. In contrast, in a parallel computer the bits of a data word can be transmitted through the gating networks from the computer's memory to an arithmetic register or back simultaneously, or in parallel. Thus it takes only one bit time interval to transmit an entire data word from the computer's memory to the arithmetic registers through the gating networks. It is apparent then that parallel computers are many times faster than serial computers. However, this increased speed is obtained at a cost of considerably more hardware; for a serial computer is required to handle only one bit at a time whereas a parallel computer is required to handle all the bits of the data word simultaneously. Thus a serial computer will be considerably less expensive but slower than a parallel computer. It is thus apparent that in applications where extremely fast manipulative speeds are not essential, it is expedient to utilize a serial computer, thus providing a computer with an optimum of utility and a minimum of cost.

The apparatus as disclosed herein provides a shift register which affords a plurality of uses in a serial computer. One use is as a dynamic storage device or a dynamic delay line in which a delay of L bit times, where L equals the number of bits in the data word, or word length, is accomplished. Additionally, by providing additional circuit means for imposing discrete signals upon selected stages, parallel readin of a data word may be achieved to create in effect a parallel-to-serial converter. Also additional circuit means for transmitting discrete signals from selected stages may be added to create in effect a serial-to-parallel converter. Further, it is apparent to one skilled in the art that the arrangement of the bistable devices or stages into groups of stages may be of a variety of combinations so as to transmit in parallel certain bit combinations peculiar to a variety of number systems. Thus the embodiment of FIG. 1 utilizes groups of three stages per group so as to accomplish a parallel shift of octal characters, i.e., three binary bits make up one octal character. It then follows that groups of four stages per group could be utilized to accomplish a parallel shift of a binary coded decimal character of four bits. Further, groups of six stages per group could be utilized to accomplish a parallel shift of a Flexowriter coded character of six bits. Another use of the above suggested additional circuit means for imposing discrete signals upon selected stages would be to permit the entry of bits of data into a preselected stage or to complement data already stored in the preselected stage. It can thus be seen that the invention disclosed herein has a myriad of uses with the embodiment of FIG. 1 being illustrative only with no limitation thereto intended.

A primary object of the present invention is to provide an apparatus for the dynamic delay of a data word consisting of a plurality of binary digits or bits.

Another object of this invention is to provide an apparatus which serially picks up a data word consisting of a plurality of bits, shifts groups of said bits in parallel, and then emits said bits in serial.

Another object of this invention is to provide an apparatus which consists of a plurality of bistable devices which ensures the parallel shifting of data in groups of bits without the loss of data significance.

Another object of this invention is to provide an apparatus which has the capability of providing serial readin–serial readout, serial readin–parallel readout, parallel readin–serial readout, and parallel readin–parallel readout.

Another object of this invention is to provide an apparatus which has the capability of providing for the serial readin of a data word which consists of a plurality of multi-bit characters, dividing said word into said characters, and then to readout said characters in parallel.

A further object of this invention is to provide an apparatus which has the capability of dynamically storing a data word which consists of a plurality of bits.

A still further object of this invention is to provide an apparatus which through the use of synchronized gating signals avoids the "race problem" which is encountered in high speed shift registers which utilize transistors as the active elements.

These and other more detailed and specific objectives will be disclosed in the course of the following specification, reference being had to the accompanying drawings in which:

FIG. 3 is an illustration of the movement of the bits of a 15 bit input data word as they are shifted through the shift register of FIG. 1 under control of the gating waveforms of FIG. 2.

Figure 1:
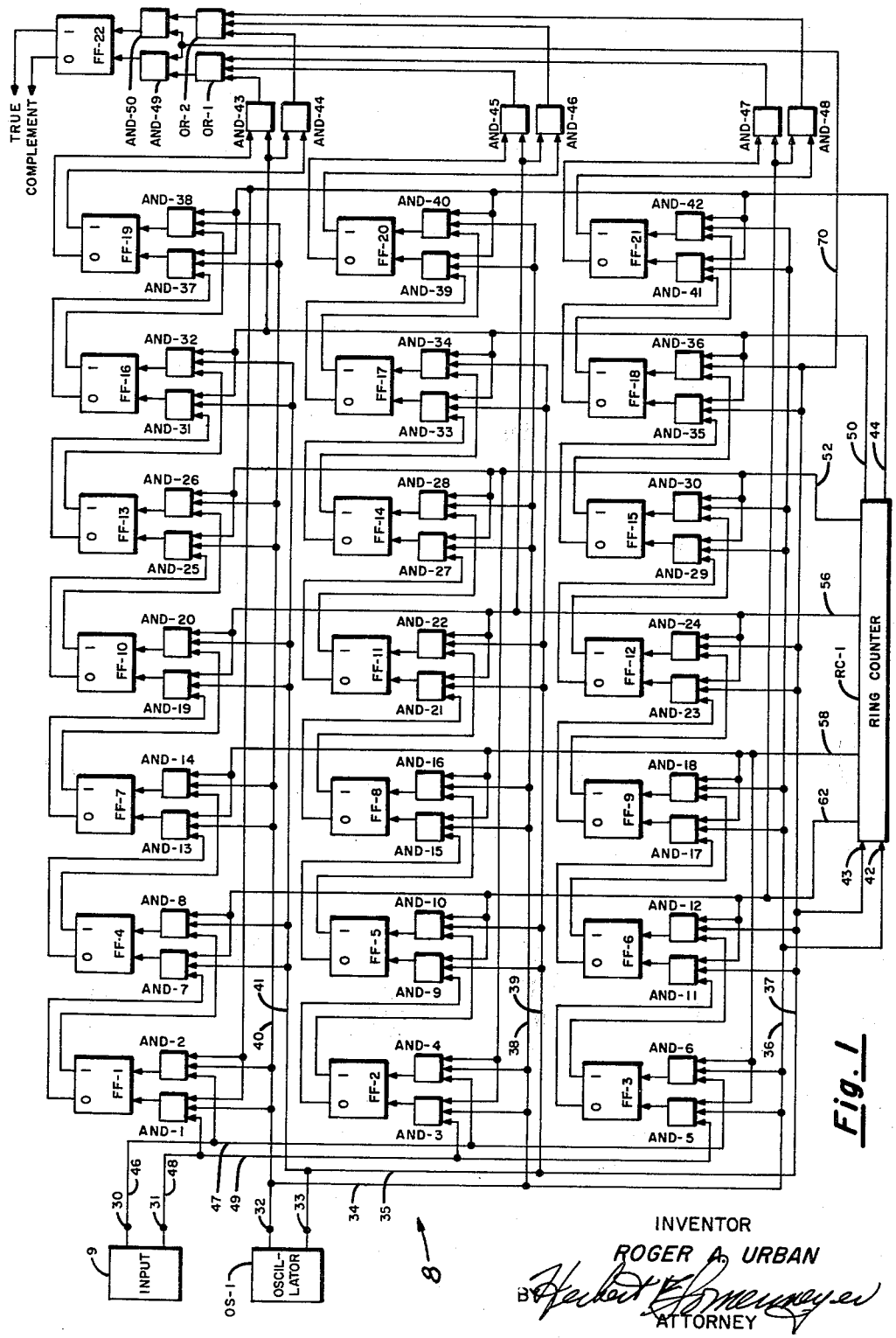
FIG. 1 is a schematic diagram of one embodiment of this invention which illustrates a shift register that will serially accept a data word of 15 bits in length, shift said word in parallel in groups of three bits, and then emit said bits serially.

The illustrated embodiment of FIG. 1 is a schematic diagram of an exemplary embodiment of this invention which advantageously employs conventional logic packages to provide a reliable high speed, low power shift register. This embodiment has the capability of serially accepting a data word of 15 bits in length, shifting said word in parallel in octal groups of 3 bits per group and then emitting said bits serially.

AND circuits, AND–1 through AND–50, are conventional bistable devices which are well known in the art. As used in the illustrated embodiment of FIG. 1 a "1" is present at the output only when all the inputs are a "1." A "0" on any one or more inputs will cause the output to be a "0."

OR circuits, OR–1 through OR–2, are conventional OR circuits which are well known in the art. A "0" is present at the output only when all the inputs are "0." A "1" on any one or more inputs will cause the output to be a "1."

FLIP-FLOP circuits, FF–1 through FF–22, are conventional bistable circuits which are well known in the art. As is well known, a flip-flop is a device that temporarily stores a single bit, and correlatively its complement. Its outputs are voltage levels representative of either a "0" or a "1" with the established level remaining fixed until some change occurs at its inputs. Generally a flip-flop has two input terminals. A "1" on a first, or set, input terminal will cause the output at the set output terminal to rise to the "1" signal level, a "1" on the other, or clear input terminal will cause the output at the set output terminal to fall to the "0" signal level. As used in the illustrated embodiment of FIG. 1, a flip-flop is designated as having a pair of 0 or clear input and output terminals and a pair of 1 or set input and output terminals. If the flip-flop is set, i.e., with a "0" being emitted from the 0 or clear side and a "1" being emitted from the 1 or set side, impressing a "1" upon the clear side input terminal results in a "1" out of the clear side and a "0" out of the set side. Conversely, impressing a "1" on the set side input terminal results in a "1" being emitted from the set side and a "0" being emitted from the clear side. Further, "1"'s on the input terminals of the clear and the set sides must be mutually exclusive, i.e., there cannot be a "1" impressed upon the 0 or clear side and the 1 or set side simultaneously, or the final condition of the flip-flop will be undeterminable.

Oscillator OS–1 is of a conventional design which is well known in the art. It is triggered by a master clock, not shown, to be synchronized with the data word that is entered into shift register 8 through input means 9. The output, which consists of waveforms WF–a and WF–b of FIG. 2 is essentially a two phase signal of frequency F and of unit time T where $T=1/F$.

Ring Counter RC–1 is of a conventional design which is well known in the art. It, upon imposition of WF–a and WF–b from oscillator OS–1, provides waveforms WF–c through WF–h of FIG. 2. Each of the waveforms WF–c through WF–h are successively displaced a time $T/2$, where $T=1/F$, and have a frequency Z where $Z=$ the frequency of WF–a divided by the number of devices of a group; or $Z=F/3$, and a unit time S where $S=$ the unit time of WF–a times the number of devices of a group, or $S=3T$. Additionally, the pulse length and displacements of WF–c through WF–h are such as to cause such waveforms to overlap and to be coincident with certain predetermined pulses of WF–a and WF–b, i.e., WF–a, pulse 10 is coincident with WF–c, pulse 12; WF–b, pulse 14 is coincident with WF–d, pulse 16, etc. These relationships provide coincident pulses whose coincident characteristics provide the gating function required to shift the signal of WF–k through shift register 8.

Figure 2:
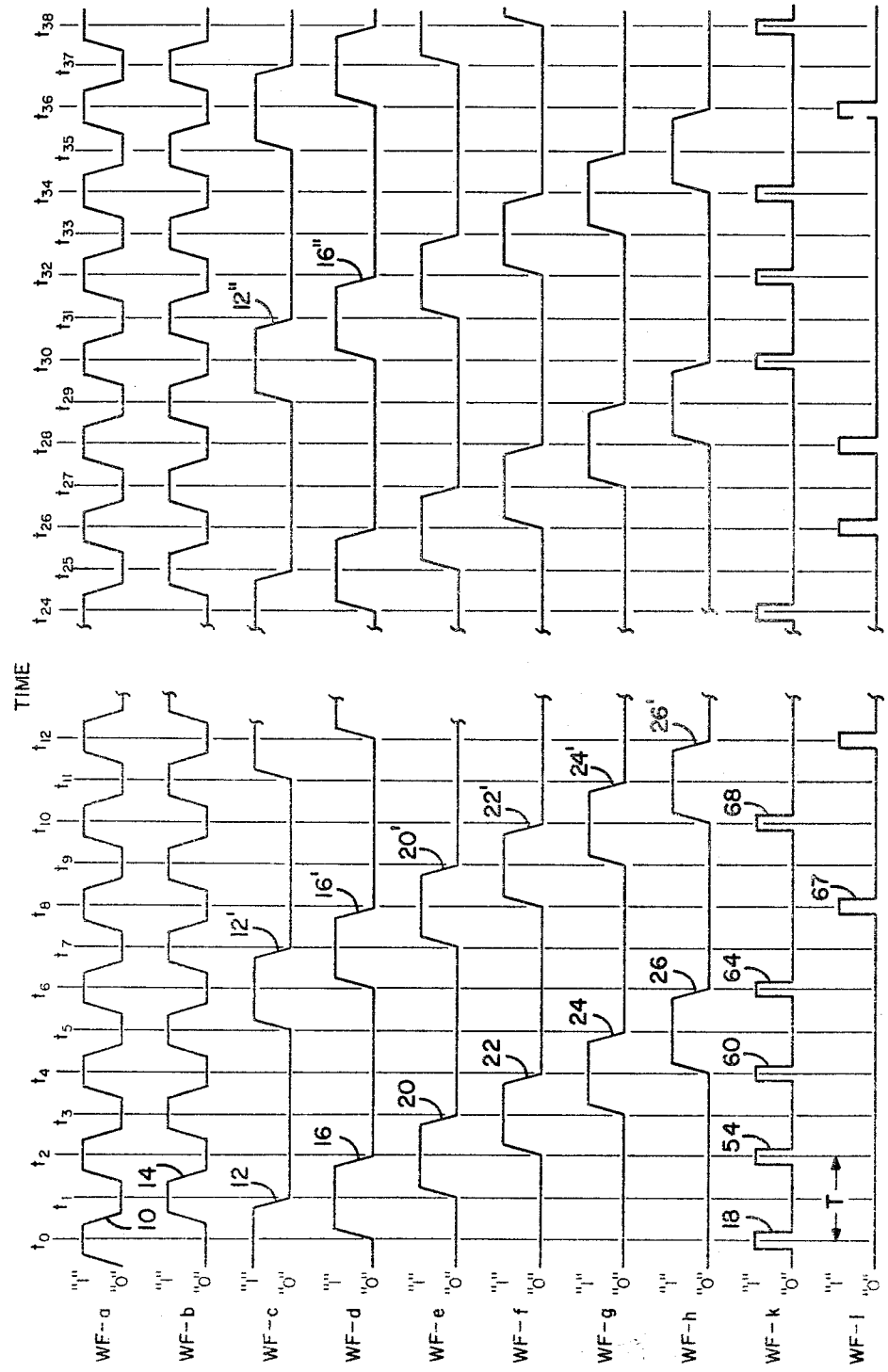
FIG. 2 is an illustration of the pulse timing of the embodiment of FIG. 1.

The embodiment of FIG. 1 is designed to accommodate a word of 15 bits in length wherein a "1" bit is represented by a pulse having a voltage level of $+1$ volt and a "0" bit is represented by a pulse having a voltage level of ground potential with the time between successive bits, or bit time, equal to T as shown in WF–$k$ of FIG. 2. The time required for a word of 15 bits to be entered into shift register 8 of FIG. 1 is thus 15 times the bit time or 15T. Additionally, the timing of the chain of bits making up the input data word, for example WF–$k$, is synchronized by means not shown to be coincident in time with WF–$a$ of FIG. 2 such that the bit of lowest significance, bit $2^b$, where $b=0$, or pulse 18 of WF–$k$ is impressed upon input terminal 30 coincident with WF–$a$ pulse 10 and WF–$c$, pulse 12 being impressed upon gate AND–2. Thus, at time $t_0$ WF–$a$ pulse 10, WF–$c$ pulse 12, and WF–$k$ pulse 18 which is bit $2^0$ of the input data word, are coincident at the input side of gate AND–2.

It will be apparent to one skilled in the art that only "1"'s are transmitted from one stage to another. As the true and the complement are transmitted in parallel from each stage, and as a "1" must appear in either the true or the complement representations of the input data word it follows that a "1" is transmitted to the set side of the succeeding stage if the true representation is a "1," or a "1" is transmitted to the clear side of the succeeding stage if the true representation is a "0." It will be appreciated that the input data word is comprised of a series of pulses of a significant voltage level representing a "1" or of an insignificant voltage level representing a "0." In the embodiment of FIG. 1 the signal representations of the input data word consist of a basic signal of ground potential which is also the insignificant voltage level representing a "0" while a "1" is represented by a +1 volt pulse. Reference to WF–$k$ of FIG. 2 which is a typical input data word configuration illustrates the true of the input data word while WF–$l$ illustrates the complement. Comparison of WF–$k$ to WF–$l$ indicates that the steady state condition of the representation of the input data word is a signal of ground potential while a "1" is represented by a +1 volt pulse and a "0" is represented by a signal of ground potential. However, it must be kept in mind that in the embodiment of FIG. 1 it is necessary that if a "0" of WF–$k$ is to be transmitted through the set sides of the stages of shift register 8 a "1" of WF–$l$ must be transmitted through the clear sides of the stages thereof. Thus, in describing the operation of shift register 8 it may be described as shifting a "0," but in fact the operation consists of the shifting of "1"'s whether in the true or the complement of the input data word.

In explaining the operation of the illustrated embodiment of FIG. 1 it will be best to assume a data word of WF–$k$ (and its complement WF–$l$) which is of such configuration as to exemplify a typical operation thereof as a shift register as employed in a serial computer in which the operation of shift register 8 is to perform a dynamic delay of the data word. Initially it is assumed that the gating signals of WF–$a$ through WF–$h$ are stabilized in conformance with FIG. 2 and that data word WF–$k$ is synchronized as stated above by means not shown.

In an endeavor to clarify the explanation of the operation of the illustrated embodiment of FIG. 1 in the following discussion, it is assumed that all flip-flops are set to the clear state, i.e., the 0, or clear, sides of FF–1 through FF–22 are emitting a "1" with the 1, or set, sides emitting a "0" although it is to be understood that such condition is not required for the proper operation of shift register 8.

At time $t_0$ WF–$a$ achieves a voltage level of +1 volt representative of a logical "1" which "1" is impressed upon input terminal 32. This "1" is then conducted through lines 34, 36, 38 and 40 to the associated AND gates and terminal 42 of ring counter RC–1. Currently, WF–$b$ achieves a voltage level of ground potential representative of a logical "0" which "0" is impressed upon input terminal 33. A "0" is then conducted through lines 35, 37, 39 and 41 to the associated AND gates and terminal 43 of ring counter RC–1. Ring counter RC–1 emits pulse 12 of WF–$c$ which is a "1" and which is conducted by way of line 44 to the associated AND gates and in particular to gates AND–1 and AND–2. Coincident with the imposition upon gates AND–1 and AND–2 of the "1"'s from WF–$a$ and WF–$c$, the first bit of the input data word as represented by pulse 18 of WF–$k$—the bit of the $2^0$ bit position—is impressed upon gates AND–2, AND–4 and AND–6 by way of lines 46 and 47 and input terminal 30. Simultaneously, the complement of the first bit of the input data word is impressed upon gates AND–1, AND–3 and AND–5 by way of lines 48 and 49 and terminal 31. Under these conditions as exemplified by FIG. 2, gate AND–2 is the only gate satisfied, having "1" inputs from WF–$a$, WF–$c$ and WF–$k$, and thus the "1" of WF–$k$ is stored in the set side of FF–1.

At time $t_1$ WF–$a$ is a "0" which "0" is impressed upon the input terminal 32. As before, this "0" is conducted through lines 34, 36, 38 and 40 to the associated AND gates and terminal 42 of ring counter RC–1. Concurrently, WF–$b$ is a "1" which is impressed upon input terminal 33. As previously stated, this "1" is conducted through lines 35, 37, 39 and 41 to the associated AND gates and terminal 43 of ring counter RC–1. Ring counter RC–1 emits pulse 16 of WF–$d$ which is conducted by way of line 50 to the associated AND gates. Under these conditions as exemplified by FIG. 2 no AND gate is satisfied by having a "1" impressed upon all its inputs. Consequently no flip-flop is set or cleared.

At time $t_2$ WF–$a$ is a "1" which "1" is impressed upon the associated circuitry as in time $t_0$. Ring counter RC–1 emits pulse 20 of WF–$e$ which is conducted by way of line 52 to the associated AND gates and in particular gates AND–3 and AND–4. Coincident with the imposition upon gates AND–3 and AND–4 of the "1's" from WF–$a$ and WF–$e$ the second bit of the input data word as represented by pulse 54 of WF–$k$—the bit of the 2' bit position—is impressed upon gates AND–2, AND–4 and AND–6 by the associated circuitry as in time $t_0$. Simultaneously, the complement of the second bit of the input data word is impressed upon gates AND–3 and AND–5 by the associated circuitry as at time $t_0$. Under these conditions as exemplified by FIG. 2, gate AND–4 is the only gate satisfied having "1" inputs from WF–$a$, WF–$e$ and WF–$k$ and thus the "1" of WF–$k$ is stored in the set side of FF–2.

At time $t_3$ WF–$a$ is a "0" which "0" is impressed upon input terminal 32. As before this "0" is conducted through lines 34, 36, 38 and 40 to the associated AND gates and terminal 42 of ring counter RC–1. Concurrently, WF–$b$ is a "1" which is impressed upon input terminal 33. As previously stated, this "1" is conducted through lines 35, 37, 39 and 41 to the associated AND gates and terminal 43 of ring counter RC–1. Ring counter RC–1 emits pulse 22 of WF–$f$ which is conducted by way of line 56 to the associated AND gates. Under these conditions as exemplified by FIG. 2 no AND gate is satisfied by having a "1" impressed upon all its inputs. Consequently, no flip-flop is set or cleared.

At time $t_4$ WF–$a$ is a "1" which "1" is impressed upon the associated circuitry as a time $t_0$. Ring counter RC–1 emits pulse 24 of WF–$g$ which is conducted by way of line 58 to the associated AND gates and in particular to gates AND–5 and AND–6. Coincident with the imposition upon gates AND–5 and AND–6 of the "1"'s of WF–$a$ and WF–$g$, the third bit of the input data word represented by pulse 60 of WF–$k$—the bit of the $2^2$ bit position—is impressed upon gates AND–2, AND–4 and AND–6 of the associated circuitry as at time $t_0$. Simultaneously, the complement of the third bit of the input data word is impressed upon gates AND–1, AND–3 and AND–5 by the associated circuitry as at time $t_0$. Under these conditions as exemplified by FIG. 2, gate AND–6 is the only gate satisfied having "1" inputs from WF–$a$, WF–$g$ and WF–$k$ and thus the "1" of WF–$k$ is stored in the set side of FF–3. At this time, between $t_4$ and $t_5$, bits 1, 2, and 3 of the input data word have been loaded into FF–1, FF–2 and FF–3, respectively, of the register of FIG. 1.

At time $t_5$ WF-$a$ is a "0" which "0" is impressed upon input terminal 32. As before, this "0" is conducted through lines 34, 36, 38 and 40 to the associated AND gates and terminal 42 of ring counter RC-1. Concurrently, WF-$b$ is a "1" which "1" is impressed upon input terminal 33. As previously stated, this "1" is conducted through lines 35, 37, 39 and 41 to the associated AND gates and in particular gates AND-7 through AND-12 and terminal 43 of RC-1. Ring counter RC-1 emits pulse 26 of WF-$h$ which is conducted by way of line 62 to the associated gates AND-7 through AND-12. Under these conditions only gates AND-8, AND-10 and AND-12 are satisfied having "1" inputs from WF-$b$, WF-$h$ and the set sides of FF-1, FF-2 and FF-3, respectively. Thus the "1"'s stored in the set sides of FF-1, FF-2 and FF-3 are loaded into the set sides of FF-4, FF-5 and FF-6, respectively.

At time $t_6$ the circuit functions as described at time $t_0$ are repeated with a "1" representative of the fourth bit of the input data word represented by pulse 64 of WF-$k$—the bit of the $2^3$ bit position—being loaded into the set side of FF-1 through gate AND-2.

At time $t_7$ circuit functions as described at time $t_1$ are repeated with no flip-flops being set or cleared.

At time $t_8$ WF-$a$ is a "1" which "1" is impressed upon the associated circuitry as at time $t_0$. Ring counter RC-1 emits pulse 20' of WF-$e$ which is conducted by way of line 52 to the associated AND gates and in particular gates AND-3 and AND-4. Coincident with the imposition upon gates AND-3 and AND-4 of the "1"'s of WF-$a$ and WF-$e$ the signal representative of the fifth bit of the input data word—the bit of the $2^4$ bit position—which is a signal of ground potential, or a "0," is impressed upon gates AND-2, AND-4 and AND-6 by the associated circuitry as in time $t_0$. Simultaneously, the complement of the fifth bit of the input data word which is represented by pulse 67 of WF-$l$, which is a "1," is impressed upon gates AND-1, AND-3 and AND-5 by the associated circuitry as at time $t_0$. Under these conditions as exemplified by FIG. 2, gate AND-3 is the only gate satisfied having "1" inputs of WF-$a$, WF-$e$ and WF-$l$ and thus the "1" of WF-$l$ is stored in the clear side of FF-2.

At time $t_9$ circuit functions as described at time $t_3$ are repeated with no flip-flops being set or cleared.

At time $t_{10}$ WF-$a$ is a "1" which "1" is impressed upon the associated circuitry as at time $t_0$. Ring counter RC-1 emits pulse 24' of WF-$g$ which is conducted by way of line 58 to gates AND-13 through AND-18 and AND-5 and AND-6. Coincident with the imposition upon gates AND-5 and AND-6 of the "1"'s from WF-$a$ and WF-$g$, the sixth bit of the input data word represented by pulse 68 of WF-$k$—the bit of the $2^5$ bit position—is impressed upon gates AND-2, AND-4 and AND-6 by the associated circuitry as at time $t_0$. Under these conditions as exemplified by FIG. 2, gate AND-6 is the only gate satisfied having "1" inputs from WF-$a$, WF-$g$ and WF-$k$ and thus the "1" of WF-$k$ is set into FF-6. As will be recalled in the above discussion, bits 1, 2 and 3 of the input data word which were "1"'s have been loaded into the set or "1" sides of FF-4, FF-5 and FF-6 at time $t_5$. Thus at time $t_{10}$ the set sides of FF-4, FF-5 and FF-6, were impressing a "1" at gate AND-14 of FF-7, at gate AND-16 of FF-8, and at gate AND-18 of FF-9, respectively. Under these conditions only gates AND-14, AND-16 and AND-18 are satisfied having "1" inputs from WF-$a$, WF-$g$ and the set sides of FF-4, FF-5 and FF-6, respectively. Thus the "1"'s stored in the set sides of FF-4, FF-5 and FF-6 are stored in the set sides of FF-7, FF-8, and FF-9, respectively.

At time $t_{11}$ WF-$a$ is a "0" which "0" is impressed upon input terminal 32. As before, this "0" is conducted through lines 34, 36, 38, and 40 to the associated AND gates and terminal 42 of RC-1. Concurrently, WF-$b$ is a "1" which "1" is impressed upon input terminal 33. As previously stated, this "1" is conducted through lines 35, 37, 39, and 41 to the associated AND gates and in particular gates AND-7 through AND-12 and terminal 43 of ring counter RC-1. Ring counter RC-1 emits pulse 26' of WF-$h$ which is conducted by way of line 62 to the associated gates AND-7 through AND-12. As will be recalled in the above discussion, bits 4 and 6 which were "1"'s have been stored in the set side of FF-1 and FF-3 and bit 5 which was a "0" has been stored in the clear side of FF-2 prior to time $t_{11}$. Thus at time $t_{11}$ the set sides of FF-4 and FF-6 were impressing a "1" at gate AND-8 of FF-4 and at gate AND-12 of FF-6, respectively, and F-2 was impressing a "1" at gate AND-9 of FF-5. Under these conditions only gates AND-8, AND-12 and AND-9 are satisfied having "1" inputs from WF-$b$, WF-$h$ and the set sides of FF-1 and FF-3 and the clear side of FF-2, respectively. Thus the "1" stored in the set side of FF-1 and FF-3 and the "0" stored in the clear side of FF-2 are stored in the respective sides of FF-4, FF-6 and FF-5.

FIG. 3 illustrates the movement of bits of a 15-bit input data word as they are shifted through the register of FIG. 1 under control of the gating waveforms of FIG. 2. This table as presented gives a clear picture of the status of the bits of the input data word for each period of time beginning at the time $t_0$ when the first bit of the input data word is impressed upon the associated gating circuits. As discussed above, near the conclusion of time $t_{11}$ and prior to time $t_{12}$, the following bits of WF-$k$ are stored in the corresponding flip-flops:

*Table I*

| Bit: | Stored |
|---|---|
| 1 | FF-7 |
| 2 | FF-8 |
| 3 | FF-9 |
| 4 | FF-4 (and FF-1) |
| 5 | FF-5 (and FF-2) |
| 6 | FF-6 and FF-3) |

As it is a characteristic of storage elements such as flip-flops FF-1 through FF-22 to retain the stored information after it has been readout, the above example of the status of the bits of the input data words at a time greater than $t_{11}$ but less than $t_{12}$ indicates that the information read into FF-4, FF-5 and FF-6 is retained in FF-1, FF-2 and FF-3, respectively, after readout therefrom. Thus, in interpreting FIG. 3 and in aiding an understanding of the flow of data from left to right it is assumed that the data previously stored in a particular flip-flop is retained therein until destroyed by the reading of the succeeding data. For example, bit 4 is read into FF-1 at time $t_6$ and retained therein until time $t_{12}$ when bit 7 is read therein with the resulting destruction of bit 4.

In a manner similar to that previously discussed, the bits of the input data word as exemplified by WF-$k$ are read into shift register 8 of FIG. 1 until at a time immediately prior to time $t_{30}$ when the following bits of WF-$k$ are stored in the corresponding flip-flops:

*Table II*

| Bit: | Stored in |
|---|---|
| 1 | FF-16 |
| 2 | FF-17 |
| 3 | FF-18 |
| 4 | FF-13 |
| 5 | FF-14 |
| 6 | FF-15 |
| 7 | FF-10 |
| 8 | FF-11 |
| 9 | FF-12 |
| 10 | FF-7 |
| 11 | FF-8 |
| 12 | FF-9 |
| 13 | FF-4 |
| 14 | FF-5 |
| 15 | FF-6 |

At time $t_{30}$ WF–$a$ is a "1" which "1" is impressed upon the associated circuitry and in particular gates AND–37 through AND–42 as at time $t_0$. Ring counter RC–1 emits pulse 12" of WF–$c$ which is conducted by way of line 44 to the associated AND gates and in particular gates AND–37 through AND–42. As is illustrated in FIG. 3, bits 1, 2, and 3 of the input data word which were "1"'s have been stored in the set sides of FF–16, FF–17, and FF–18, respectively, prior to time $t_{30}$. Thus at time $t_{30}$ the set sides of FF–16, FF–17, and FF–18 were impressing a "1" at gate AND–38 of FF–19, at gate AND–40 of FF–20, and at gate AND–42 of FF–21, respectively. Under these conditions only gates AND–38, AND–40 and AND–42 are satisfied, having "1" inputs from WF–$a$, WF–$c$ and the set sides of FF–16, FF–17, and FF–18, respectively. Thus the "1"'s stored in the set sides of the FF–16, FF–17, and FF–18 are stored in the set sides of FF–19, FF–20, and FF–21, respectively.

At time $t_{31}$ WF–$b$ is a "1" which "1" is impressed upon the associated circuitry and in particular gates AND–31 through AND–36, AND–49 and AND–50 as at time $t_1$. Ring Counter RC–1 emits pulse 16" of WF–$d$ which is conducted by way of line 50 to the associated AND gates and in particular gates AND–31 through AND–36, AND–43, and AND–44. As is illustrated in FIG. 3, bits 4 and 6 which are "1"'s have been stored in the set sides of FF–13 and FF–15 and bit 5 which is a "0" has been stored in the clear side of FF–14 prior to time $t_{31}$. Thus at time $t_{31}$ the set sides of FF–13 and FF–15 are impressing a "1" at gates AND–32 of FF–16 and at gate AND–36 of FF–18 and the clear side of FF–14 is impressing a "1" at gate AND–33 of FF–17. Under these conditions gates AND–32, AND–36, and AND–33 are satisfied having "1" inputs from WF–$b$, WF–$d$ and the set sides of FF–13 and FF–15 and the clear side of FF–14, respectively. Thus the "1" stored in the set sides of FF–13 and FF–15 and the "1" stored in the clear side of FF–14 are stored in the respective sides of FF–16, FF–18 and FF–17. Concurrently, the clear and set sides of FF–19, FF–20 and FF–21 are impressing their contents on their respective gates AND–43 through AND–48. As gates AND–43 and AND–44 are the only gates ANDed by WF–$d$, only the "1" stored in the set side of FF–19 is passed through its respective gate AND–44, to its respective gate OR–2, and then to gate AND–50 which is ANDed by the "1" of WF–$b$ by way of line 70. Thus the "1" stored in the set side of FF–19 is impressed upon FF–22 which emits a "1" from the set side thereof.

In a manner similar to that explained above and as illustrated in FIG. 3, it can be seen that at time $t_{32}$ the contents of FF–10, FF–11, and FF–12 are stored in FF–13, FF–14, and FF–15, respectively.

In a manner similar to that illustrating the circuit functions at time $t_{31}$ it can be seen that at time $t_{33}$ the contents of FF–20 are stored in FF–22 through the ANDing action of WF–$f$ at gates AND–45 and AND–46 and the ANDing action of WF–$b$ at gates AND–49 and AND–50. Additionally, and as illustrated in FIG. 3, the contents of FF–7, FF–8 and FF–9 are stored in FF–10, FF–11, and FF–12, respectively, through the ANDing action of WF–$b$ and WF–$f$ at gates AND–19 through AND–24.

In a manner as explained above and as illustrated in FIG. 3, it can be seen that at time $t_{34}$ the contents of FF–4, FF–5, and FF–6 are loaded in FF–7, FF–8, and FF–9, respectively.

In a manner similar to that illustrating the circuit functions at time $t_{31}$ it can be seen that at time $t_{35}$ the contents of FF–21 are stored in FF–22 through the ANDing action of WF–$h$ at gates AND–47 and AND–48 and the ANDing action of WF–$b$ at gates AND–49 and AND–50.

In a manner similar to that illustrating the circuit functions at time $t_{30}$ through $t_{35}$ it can be seen that the contents of FF–1 through FF–18 are successively shifted into higher ordered flip-flops until at successive occurrences of WF–$b$ being a "1" the contents of FF–19, FF–20, and FF–21 are stored in FF–22, and consequently are emitted as a train of binary signals at a frequency determined by the frequency of WF–$b$, or at a frequency of $F=1/T$.

It is apparent that upon a reading of the above description of the illustrated embodiment of FIG. 1, certain optimum relationships of the number of phases and frequencies of the signals involved and the particular configuration of bistable devices apply. Thus, it is apparent that the number of bits forming the input data word—if the register is to be capable of holding the entire word, the number of bits of the input data word forming a group thereof and the frequency of the input data word determine the frequencies and number of phases of the clocking signals, the number of bistable devices per group and the number of groups per shift register. Thus, if an input data word consists of a serial chain of $L$ bits of a frequency $F$ and of $m$ bits per group, it is apparent that if oscillator OS–1 provides a $\phi$ phase signal of frequency $F$, ring counter RC–1 should provide a $m\phi$ phase signal of frequency $F/m$ as illustrated in FIG. 2. Under these conditions and as discussed hereinbefore, the bits of the input data word are entered into FF–1, FF–2 and FF–3 upon successive occurrences of the odd phase signals of ring counter RC–1—WF–$c$, WF–$e$ and WF–$g$, and shifted as a group into the next and successive groups of devices at successive occurrences of the even phase signals of ring counter RC–1, WF–$d$, WF–$f$ and WF–$h$. The bits of the input data word are shifted through the shift register, group-by-group, to the last group—FF–19, FF–20 and FF–21—from where they are exited serially from FF–22 at the successive occurrences of the even phase signals of ring counter RC–1.

As an example of the above relationships, consider the embodiment of FIG. 1 as including an array of $n+1=21+1$ bistable devices arranged in $y=7$ groups of $m=3$ devices per group where $n=my=3\times7=21$ having input means providing the true and the complement representation of a multi-bit input data word of $L=15$ bits and a frequency $F$ where $F=1/T$ and $T=$unit signal time or time between successive bit representations, oscillator means providing a $\phi=2$ phase clocking signal of frequency $F$, and a ring counter providing a $m\phi=3\times 2$ phase clocking signal of frequency $Z$ where $Z=F/m=F/3$ and of a unit signal time $S$ where $S=mT=3\times T$. First and successive bits—up to $m=3$ bits—of the input data word of $L=15$ bits are entered into the first group of $m=3$ devices—FF–1, FF–2 and FF–3—at a frequency $F$ at successive occurrences of said first clocking means first phase signal of said $\phi=2$ phase signal with each group of $m=3$ bits of the input data word then shifted into successive groups of devices from said first group of devices—1,—, $y$–2, $y$–1,—into the last group of devices—$y$=7—at a frequency $$\frac{F}{m}=\frac{F}{3}$$

at successive times $$T\left(m-\frac{1}{\phi}\right)=T\left(3-\frac{1}{2}\right)$$

until the bits of the input data word are exited serially from the $(n+1)$'th, or 22nd, device at successive occurrences of said first clocking means $\phi$'th$=$2nd phase signal.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A digital signal responsive device comprising $n$ bistable devices arranged in $y$ groups of $m$ devices per group, each device having set and clear sides with each of said sides having an input and an output associated therewith; first clocking means providing a $\phi$ phase clocking signal of frequency F and a unit signal time T where $T=1/F$, second clocking means generating a $m\phi$ phase clocking signal of frequency Z and a unit signal time $m$T, input means providing the true and the complement of a data word of unit signal time T; circuit means coupling the true and the complement of the data word to the first group of devices; circuit means coupling the outputs of the devices of each group to the inputs of corresponding devices of the next successive group of devices, circuit means coupling discrete phase signals of said $\phi$ phase signal to predetermined respective groups of devices, circuit means coupling discrete phase signals of said $m\phi$ phase signal to predetermined respective groups of devices, predetermined combinations of said first and second clocking signals and true and complement data word signals successively gating groups of $m$ true and complement data word signal representations serially into a first group of $m$ devices; predetermined combinations of said first and second clocking signals successively gating in parallel the groups of the $m$ representations of the true and complement of the data word signals from the first, through succeeding, and into the $y$'th group of devices, and then gating in serial the groups of the $m$ representations of the true and the complement of the data word signals from the $y$'th group of devices.

2. The apparatus of claim 1 wherein said bistable devices include at least one semiconductor active element.

3. The apparatus of claim 1 wherein: $\phi=2$, $m=3$, $y=7$, and $n=21$.

4. A digital signal responsive device comprising $n+1$ bistable devices arranged in $y$ groups of $m$ devices per group, each device having set and clear sides with each of said sides having an input and an output associated therewith: first clocking means providing a $\phi$ phase clocking signal of frequency F and a unit signal time T where $T=1/F$; second clocking means generating a $m\phi$ phase clocking signal of frequency Z and a unit signal time $m$T; input means providing the true and the complement of a data word of unit signal time T; circuit means coupling the true and the complement of the data word to a first group of devices; circuit means coupling the outputs of the devices of each group to the inputs of corresponding devices of the next successive group of devices; circuit means coupling discrete phase signals of said $\phi$ phase signal to predetermined respective groups of devices, circuit means coupling discrete phase signals of said $m\phi$ phase signal to predetermined respective groups of devices, predetermined combinations of said first and second clocking signals and true and complement data word signals gating $m$ true and complement data word signal representations serially into the first group of devices; predetermined combinations of said first and second clocking signals successively gating in parallel the representations of the true and complement of the data word signals from the first, through succeeding, and into the $y$th group of devices, and then gating in serial the representations of the true and the complement of the data word signals from the $y$th group of devices and through said $(n+1)$th device.

5. A digital signal responsive device comprising $n$ bisstable devices arranged in $y$ groups of $m$ devices per group, each device having set and clear sides with each of said sides having an input and an output associated therewith: first clocking means providing a $\phi$ phase clocking signal of frequency F and a unit signal time T where $T=1/F$; second clocking means generating a $m\phi$ phase clocking signal of frequency Z and a unit signal time $m$T; input means providing the true and the complement of a data word of unit signal time T; circuit means coupling the true and the complement of the data word to a first group of devices; circuit means coupling the outputs of the devices of each group to the corresponding inputs of corresponding devices of the next successive group of devices; circuit means coupling discrete phase signals of said $\phi$ phase signal to predetermined respective groups of devices; circuit means coupling discrete phase signals of said $m\phi$ phase signal to predetermined respective groups of devices, circuit means coupling a first and alternately successive phase signal of said $m\phi$ clocking signal to a first and successive device, respectively, of said first group of devices; predetermined combinations of said first and second clocking signals and true and complement data word signals gating $m$ true and complement data word signal representations serially into the first group of devices; predetermined combinations of said first and second clocking signals successively gating in parallel the representations of the true and complement of the data word signals from the first, through succeeding, and into the $y$th group of devices, and then gating in serial the representations of the true and the complement of the data word signals from the $y$th group of devices.

6. A shift register of bistable devices, having bistable states designated the set and the clear states, comprising: $n$ bistable devices arranged in $y$ groups of $m$ devices per group, each device having set and clear sides with each of said sides having an input and output associated therewith; first clocking means generating a $\phi$ phase first clocking signal of frequency F; second clocking means generating a $m\phi$ phase second clocking signal each phase of a frequency $F/m$, input means providing the true and the complement of an input data word of frequency F; circuit means coupling the true and the complement of the input data word to the input of the set and the clear sides, respectively of the devices of a first group of devices; circuit means coupling the output of the set and the clear sides of the devices of each group to the input of the set and the clear sides, respectively, of the corresponding devices of a succeeding group of devices, means coupling each phase signal of said first clocking means to separate groups of devices; circuit means coupling each phase signal of said second clocking means to separate groups of devices; first and alternately successive phase signals of said second clocking means coupled to first and successive devices, respectively, of said first group of devices; discrete bits of said input data word serially entered into said first group of devices at successive occurrences of said first clocking means first phase signal, said bits which are then stored in said first group of devices being shifted into successive groups of devices in parallel, and said bits being emitted serially from said $y$th group of devices.

7. A shift register of bistable devices, having bistable states designated the set and the clear states, comprising: $n$ bistable devices arranged in $y$ groups of $n$ devices per group, each device having set and clear sides with each of said sides having an input and an output associated therewith; first clocking means generating a $\phi$ phase first clocking signal of frequency F and of a unit signal time T where $T=1/F$; second clocking means generating a $m\phi$ phase second clocking signal of a frequency Z and of a unit signal time S where $S=m$T; input means providing the true and the complement of an input data word of frequency F and of a unit signal time T; circuit means coupling the true and the complement of the input data word to the input of the set and the clear sides, respectively, of the devices of a first group of devices; circuit means coupling the output of the set and the clear sides of the devices of each group to the input of the set and the clear sides, respectively, of the corresponding device of the succeeding group of devices; means coupling each phase signal of said first clocking means to separate groups of devices; circuit means coupling each phase signal of said second clocking means to separate groups of devices; first and alternately successive phase signals of said second clocking means coupled to first and successive devices, repectively, of said first group of devices; discrete bits of said input data word serially entered into said first group of devices at successive occurrences of said first clocking means first phase signal, said bits which are then stored in said first group of devices being shifted into successive groups of devices in parallel at successive times $$T(m-1/\phi)$$

and said bits being emitted serially from said $y$th group of devices at successive occurrences of said first clocking means $\phi$th phase signal.

8. A shaft register of $n+1$ bistable devices having bistable states designated the set and clear states, comprising: n bistable devices arranged in $y$ groups of $m$ devices per group, each device having set and clear sides with each of said sides having an input and an output associated therewith; first clocking means generating a 2 phase, first clocking signal of frequency F and of a unit signal time T, where $T=1/F$; second clocking means generating a $2m$ phase, second clocking signal having a unit signal time S, where $S=mT$; first input means providing the true and the complement of an input data word having a unit signal time T; first circuit means coupling the true of the input data word to the set sides of the devices of a first group of devices; second circuit means coupling the complement of the input data word to the clear sides of the devices of said first group of devices; third circuit means coupling said first clocking means first phase signal to the clear and set sides of the devices of said first and successive alternate group of devices; first and second output gating means; fourth circuit means coupling said first clocking means second phase signal to the clear and set sides of the devices of second and successive alternate groups of devices, and to said first and second output gating means; first and successive alternate phase signals of said second clocking signal being coincident with successive pulses of said first clocking signal first phase; second and successive alternate phase signals of said second clocking signal being coincident with successive pulses of said first clocking signal second phase; circuit means coupling said second clocking signal first phase to the clear and set sides of the devices of the $y$th group of said devices and to the clear and set sides of a first device of said first group of devices; circuit means coupling said second clocking signal second phase to the clear and set sides of the devices of the $(y-1)$th group of said devices; circuit means coupling said second clocking signal third phase to the clear and set sides of the $(y-2)$th group of said devices and to the clear and set sides of a second device of said first group of devices; circuit means coupling said second clocking signal fourth phase to the clear and set sides of the $(y-3)$th group of said devices; the above circuit configurations repeated with circuit means coupling said second clocking signal $(2m-1)$th phase to the clear and set sides of the $m$th group of said devices and to the clear and set sides of the $m$th device of said first group of devices, and with circuit means coupling said second clocking signal $2m$th phase to the clear and set sides of the $(m-1)$th group of said devices; circuit means coupling the output of the set sides of said first through the $m$th devices of said $y$th group to said first output gate; circuit means coupling the output of the clear sides of said first through the $m$th devices of said $y$th group to said second output gate; an $(n+1)$th bistable device having set and clear sides with each of said sides having an input and an output associated therewith; circuit means coupling said first output gate to the input of the set side of said $(n+1)$th bistable device; circuit means coupling said second output gate to the input of the clear side of said $(n+1)$th bistable device; discrete bits of said input data word serially entered into said first group of devices at successive occurrences of said first clocking means first phase signal, said bits which are then stored in said first group of devices being shifted into successive groups of devices in parallel at successive times $T(m-1/2)$, and said bits being emitted serially from said $(n+1)$th device at successive occurrences of said first clocking means second phase signal.

9. A shift register of $n+1$ bistable devices having bistable states designated the set and clear states, comprising: $n$ bistable devices arranged in $y$ groups of $m$ devices per group, each device having set and clear sides with each of said sides having an input and an output associated therewith; first clocking means generating a 2 phase, first clocking signal of frequency F and of a unit signal time T, where $T=1/F$; second clocking means generating a $2m$ phase, second clocking signal of frequency Z, where $Z=F/m$, and of a unit signal time S, where $S=mT$; first input means providing the true and the complement of an input data word of L bits and frequency F; first circuit means coupling the true of the input data word to a first group of devices; second circuit means coupling the complement of the input data word to said first group of devices; third circuit means coupling said first clocking means first phase signal to first and successive alternate groups of devices; first and second output gating means; fourth circuit means coupling said first clocking means second phase signal to second and successive alternate groups of devices, and to said first and second output gating means, first and successive alternate phase signals of said second clocking signal being coincident with successive pulses of said first clocking signal first phase; second and successive alternate phase signals of said second clocking signal being coincident with successive pulses of said first clocking signal second phase; circuit means coupling said second clocking signal first phase to the $y$th group of said devices and to a first device of said first group of devices; first and second gating means associated with the output of the set and clear sides, respectively, of each device of the $y$th group of devices, circuit means coupling said second clocking signal second phase to the $(y-1)$th group of said devices and to first and second gating means which are associated with the output of the set and clear sides, respectively, of a first device of said $y$th group of devices; circuit means coupling said second clocking signal third phase to the $(y-2)$th group of devices and to a second device of said first group of devices; circuit means coupling said second clocking signal fourth phase to the $(y-3)$th group of devices and to first and second gating means which are associated with the output of the set and clear sides, respectively, of a second device of said $y$th group of devices; the above circuit configurations repeated with circuit means coupling said second clocking signal $(2m-1)$th phase to the $m$th group of devices and to the $m$th device of said first group of devices, and with circuit means coupling said second clocking signal $2m'$th phase to the $(m-1)$th group of devices and to first and second gating means associated with the output of the set and clear sides, respectively, of the $m$th device of said $y$th group of devices; circuit means coupling said first gating means which are associated with the output of the set sides of said first through the $m$th devices of said $y$th group to said first output gating means; circuit means coupling said second gating means which are associated with the output of the clear sides of said first through the $m$th devices of said $y$th group to said second output gating means; an $(n+1)$th bistable device having set and clear sides with each of said sides having an input and an output associated therewith; circuit means coupling said first output gating means to the input of the set side of said $(n+1)$th bistable device; circuit means coupling said second output gating means to the input of the clear side of said $(n+1)$th bistable device; discrete bits of said input data word serially entered into said first group of devices at successive occurrences of said first clocking means first phase signal, said bits which are then stored in said first group of devices being shifted into successive groups of devices in parallel at successive times $$T(m-1/2)$$

and said bits being emitted serially from said $(n+1)$th device at successive occurrences of said first clocking means second phase signal.

10. A shift register of $n+1$ bistable devices having bistable states designated the set and clear states, comprising: $n$ bistable devices arranged in $y$ groups of $m$ devices per group, each device having set and clear sides with each of said sides having an input and an output associated therewith; first clocking means generating a 2 phase, first clocking signal of frequency F and of a unit signal time T, where $T=1/F$; second clocking means generating a $2m$ phase, second clocking signal of a frequency Z where $Z=F/m$, and of a unit signal time S, where $S=mT$; first input means providing the true and the complement of an input data word of L bits and frequency F; first and second gating means associated with the input of the set sides and the clear sides, respectively, of each of said $n$ devices, first circuit means coupling the true of the input data word to said first gating means of a first group of devices; second circuit means coupling the complement of the input data word to said second gating means of said first group of devices; third circuit means coupling said first clocking means first phase signal to said first and second gating means of said first and successive alternate groups of devices and to said second clocking means; first and second output gating means; fourth circuit means coupling said first clocking means second phase signal to said first and second gating means of second and successive alternate groups of devices, to said second clocking means, and to said first and second output gating means; first and successive alternate phase signals of said second clocking signal being coincident with successive pulses of said first clocking signal first phase; second and successive alternate phase signals of said second clocking signal being coincident with successive pulses of said first clocking signal second phase; circuit means coupling said second clocking signal first phase to said first and second gating means of the $y$th group of devices and to said first and second gating means of a first device of said first group of devices; first and second gating means associated with the output of the set and clear sides, respectively, of each device of the $y$th group of devices; circuit means coupling said second clocking signal second phase to said first and second gating means of the $(y-1)$th group of devices and to said first and second gating means which are associated with the output of the set and clear sides, respectively, of a first device of said $y$th group of devices; circuit means coupling said second clocking signal third phase to said first and second gating means of the $(y-2)$th group of said devices and to said first and second gating means of a second device of said first group of devices; circuit means coupling said second clocking signal fourth phase to said first and second gating means of the $(y-3)$th group of devices and to said first and second gating means which are associated with the output of the set and clear sides, respectively, of a second device of said $y$th group of devices; the above circuit configurations repeated with circuit means coupling said second clocking signal $(2m-1)$th phase to said first and second gating means of the $m$th group of devices and to said first and second gating means of the $m$th device of said first group of devices, and with circuit means coupling said second clocking signal $2m$th phase to said first and second gating means of the $(m-1)$th group of devices and to said first and second gating means associated with the output of the set and clear sides, respectively, of the $m$th device of said $y$th group of devices; circuit means coupling said first gating means which are associated with the output of the set sides of said first through the $m$th devices of said $y$th group to said first output gating means; circuit means coupling said second gating means which are associated with the output of the clear sides of said first through the $m$th devices of said $y$th group to said second output gating means; an $(n+1)$th bistable device having set and clear sides with each of said sides having an input and an output associated therewith; circuit means coupling said first output gating means to the input of the set side of said $(n+1)$th bistable device; circuit means coupling said second output gating means to the input of the clear side of said $(n+1)$th bistable device; discrete bits of said input data word serially entered into said first group of devices at successive occurrences of said first clocking means first phase signal, said bits which are then stored in said first group of devices being shifted into successive groups of devices in parallel at successive times $T(m-1/2)$, and said bits being emitted serially from said $(n+1)$th device at successive occurrences of said first clocking means second phase signal.

11. A digital signal responsive device comprising a plurality of bistable devices arranged in a plurality of groups of a plurality of devices per group, each device having set and clear sides with each of said sides having an input and an output associated therewith:

first clocking means providing a first clocking signal;
second clocking means providing a second clocking signal;
input means providing the true and the complement signal representations of a multi-bit data word;
circuit means coupling the signal representations of the true and the complement of the data word to a first group of devices;
circuit means coupling the outputs of the devices of each group to the inputs of corresponding devices of the next successive group of devices;
circuit means coupling discrete phase signals of said first clocking signal to predetermined respective groups of devices;
circuit means coupling discrete phase signals of said second clocking signal to predetermined respective groups of devices;
predetermined combinations of said first and second clocking signals with said true and complement data word signal representations successively gating groups of true and complement data word signal representations serially into the first group of devices;
predetermined combinations of said first and second clocking signals successively gating in parallel the groups of the signal representations of the true and complement of the data word from the first, through succeeding, and into the last group of devices;
and then gating in serial the groups of the signal representations of the true and the complement of the data word from the last group of devices.

12. A digital signal responsive device comprising:
a plurality of bistable devices arranged in groups of no more than $m$ devices per group, each device having set and clear sides with each of said sides having an input and an output associated therewith;
first clocking means providing a first clocking signal of at least two phases each of frequency F and a unit signal time where $T=1/F$;
second clocking means providing a second clocking signal of at least $2m$ phases each of frequency Z and a unit signal time $mT$;
input means providing the true and the complement signal representations of a multi-bit data word of unit signal time T;
circuit means coupling the signal representations of the true and the complement of the data word to a first group of devices;
circuit means coupling the outputs of the devices of each group to the inputs of corresponding devices of the next successive group of devices;
circuit means coupling discrete phase signals of said first clocking signal to predetermined respective groups of devices;
circuit means coupling discrete phase signals of said second clocking signal to predetermined respective groups of devices;
predetermined combinations of said first and second clocking signals with said true and complement data word signal representations gating $m$ true and complement data word signal representations serially into the first group of devices;

predetermined combinations of said first and second clocking signals successively gating in parallel $m$ signal representations of the true and the complement of the data word from the first, through succeeding, and into the last group of devices;

and then gating in serial the signal representations of the true and the complement of the data word from the last group of devices.

13. A digital signal responsive device comprising:

a plurality of bistable devices arranged in a plurality of groups of no more than $m$ devices per group, each device having set and clear sides with each of said sides having an input and an output associated therewith;

first clocking means providing a first multi-phase clocking signal of frequency F and a unit time T where $T=1/F$;

second clocking means providing a second multi-phase clocking signal of frequency Z and a unit signal time $mT$;

input means providing the true and the complement of a data word of frequency F and a unit signal time T;

circuit means coupling the true and the complement signal representations of the data word to a first group of devices;

circuit means coupling the outputs of the devices of each group to the corresponding inputs of corresponding devices of the next successive group of devices;

circuit means coupling discrete phase signals of said first clocking signal to predetermined respective groups of devices;

circuit means coupling discrete phase signals of said second clocking signal to predetermined respective groups of devices;

circuit means coupling the first and alternately successive phase signals of said second clocking signal to the first and successive devices, respectively, of said first group of devices;

predetermined combinations of said first and second clocking signals with said true and complement data word signal representations gating no more than $m$ true and complement data word signal representations serially into the first group of devices;

predetermined combinations of said first and second clocking signals successively gating in parallel the signal representations of the true and the complement of the data word from the first, through succeeding, and into the last group of devices;

and then gating in serial the signal representations of the true and the complement of the data word from the last group of devices.

14. A digial signal responsive device comprising:

a plurality of bistable devices arranged in a plurality of groups of a plurality of devices per group, each device having set and clear sides with each of said sides having an input and an output associated therewith;

first clocking means generating a multi-phase first clocking signal;

second clocking means generating a multi-phase second clocking signal;

input means providing the true and the complement signal representations of a multi-bit input data word;

circuit means coupling the true and the complement signal representations of the input data word to the inputs of the set and the clear sides, respectively, of the devices of a first group of devices;

circuit means coupling the outputs of the set and the clear sides of the devices of each group to the input of the set and clear sides, respectively, of the corresponding devices of the succeeding group of devices;

circuit means coupling each phase signal of said first clocking means to separate groups of devices;

circuit means coupling each phase signal of said second clocking means to separate groups of devices;

first and alternately successive phase signals of said second clocking means coupled to first and successive devices, respectively, of said first group of devices;

discrete signal representations of said input data word serially entered into said first group of devices at successive occurrences of said first clocking means first phase signal, said discrete signal representations which are then stored in said first group of devices being shifted into successive groups of devices in parallel, and said discrete signal representations being emitted serially from said last group of devices.

References Cited by the Examiner
UNITED STATES PATENTS
2,957,163   10/60   Kodis _____ 340—174

ARTHUR GAUSS, *Primary Examiner.*

GEORGE N. WESTBY, *Examiner.*